United States Patent
Rai

(10) Patent No.: US 8,311,360 B2
(45) Date of Patent: Nov. 13, 2012

(54) SHADOW REMOVER

(75) Inventor: Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 1035 days.

(21) Appl. No.: 12/270,527

(22) Filed: Nov. 13, 2008

(65) Prior Publication Data

US 2010/0119153 A1 May 13, 2010

(51) Int. Cl.
*G06K 9/40* (2006.01)
*H04N 1/407* (2006.01)

(52) U.S. Cl. .................... 382/264; 358/3.27

(58) Field of Classification Search .................. None
See application file for complete search history.

(56) References Cited

U.S. PATENT DOCUMENTS

| | | | | |
|---|---|---|---|---|
| 4,311,044 A * | 1/1982 | Marshall et al. | ........... | 73/146 |
| 4,888,812 A * | 12/1989 | Dinan et al. | ........... | 382/140 |
| 4,908,875 A * | 3/1990 | Assael et al. | ........... | 382/272 |
| 5,265,200 A * | 11/1993 | Edgar | ........... | 345/589 |
| 5,506,917 A * | 4/1996 | Ito et al. | ........... | 382/271 |
| 5,621,811 A * | 4/1997 | Roder et al. | ........... | 382/147 |
| 5,647,026 A * | 7/1997 | Kwarta | ........... | 382/270 |
| 5,960,121 A | 9/1999 | Takahashi | | |
| 5,966,222 A * | 10/1999 | Hirata et al. | ........... | 358/520 |
| 5,995,248 A * | 11/1999 | Katori et al. | ........... | 358/2.1 |
| 5,999,279 A * | 12/1999 | Kouzaki et al. | ........... | 358/520 |
| 6,028,957 A * | 2/2000 | Katori et al. | ........... | 382/162 |
| 6,330,050 B1 * | 12/2001 | Takahashi et al. | ........... | 355/25 |
| 6,512,838 B1 * | 1/2003 | Rafii et al. | ........... | 382/106 |
| 6,674,895 B2 * | 1/2004 | Rafii et al. | ........... | 382/154 |
| 6,694,051 B1 * | 2/2004 | Yamazoe et al. | ........... | 382/167 |
| 6,980,335 B2 * | 12/2005 | Kubo | ........... | 358/518 |
| 7,075,243 B2 | 7/2006 | Park | | |
| 7,133,537 B1 * | 11/2006 | Reid | ........... | 382/103 |
| 7,330,287 B2 * | 2/2008 | Sharman | ........... | 358/1.9 |
| 7,382,507 B2 * | 6/2008 | Wu | ........... | 358/523 |
| 7,408,627 B2 * | 8/2008 | Bamji et al. | ........... | 356/5.01 |
| 7,526,102 B2 * | 4/2009 | Ozer | ........... | 382/103 |
| 7,587,083 B2 * | 9/2009 | Tabata et al. | ........... | 382/162 |
| 7,609,875 B2 * | 10/2009 | Liu et al. | ........... | 382/154 |
| 7,634,108 B2 * | 12/2009 | Cohen et al. | ........... | 382/103 |
| 7,646,329 B2 * | 1/2010 | Britton et al. | ........... | 342/28 |
| 7,756,354 B2 * | 7/2010 | Washisu | ........... | 382/274 |
| 2002/0054374 A1 * | 5/2002 | Inoue et al. | ........... | 358/461 |
| 2004/0130638 A1 | 7/2004 | Sakamoto | | |
| 2004/0184672 A1 * | 9/2004 | Murakami | ........... | 382/274 |
| 2005/0219270 A1 | 10/2005 | De Greef et al. | | |
| 2005/0254077 A1 | 11/2005 | Kinumura et al. | | |
| 2006/0035679 A1 | 2/2006 | Han et al. | | |

(Continued)

FOREIGN PATENT DOCUMENTS

EP     1667066 A1   6/2006

(Continued)

*Primary Examiner* — Manav Seth

(57) ABSTRACT

A method and apparatus for removing shadows from image data is provided. The apparatus includes image capture circuitry and a graphics processor. The apparatus also includes shadow remover circuitry in communication with the image capture circuitry and the graphics processor. The shadow remover circuitry includes shadow remover location circuitry configured to identify shadow image data and shadow correction circuitry configured to selectively apply a smoothing function to the shadow image data based on a value of the shadow image data. The shadow correction circuitry is configured to select between smoothed shadow image data and a value representing an average of neighboring pixel values of non-shadow image data. A display to present an output of the shadow remover circuitry is also included.

15 Claims, 7 Drawing Sheets

U.S. PATENT DOCUMENTS

| | | |
|---|---|---|
| 2006/0061603 A1 | 3/2006 | Kort et al. |
| 2006/0066546 A1 | 3/2006 | Miyasaka |
| 2006/0077491 A1 | 4/2006 | Morita |
| 2007/0189627 A1* | 8/2007 | Cohen et al. .................. 382/254 |
| 2009/0010495 A1* | 1/2009 | Schamp et al. ............... 382/106 |
| 2009/0304151 A1* | 12/2009 | Yamada et al. ................. 378/62 |
| 2010/0045811 A1* | 2/2010 | Harada et al. ............. 348/222.1 |

FOREIGN PATENT DOCUMENTS

| | | |
|---|---|---|
| JP | 9200790 | 7/1997 |
| JP | 2003233363 | 8/2003 |
| JP | 2003319201 | 11/2003 |
| JP | 2006106574 | 4/2006 |

* cited by examiner

SHADOW REMOVER

BACKGROUND

Many digital cameras, especially the lower quality digital cameras associated with cell phones or other portable electronic devices, do not include a flash. Pictures taken without a flash may produce distorted images due to the effect of shadowing. Shadows are dark areas that reduce the quality of the image because they reduce the detail and distort smooth transitions between objects within the captured image. When shadowing occurs, the displayed image may not be a true representation of the original captured image, this of course is undesirable. Even if a flash is provided, shadowing may still occur due to many other factors, which may include quality of the camera, the use of inexpensive lenses to keep the cost of the device low, limited computing resources of the camera or other portable image capturing device, location of the image being captured, and the experience of the photographer/user. In addition, images with bright backgrounds may suffer from poor quality also.

What is needed is a way to improve the quality of digital images by eliminating or reducing any shadowing/brightening effects, thereby increasing the detail of the image and smoothing the transitions within the displayed image.

SUMMARY

Broadly speaking, the present invention fills these needs by providing shadow/brightening adjusting circuitry and a corresponding method. It should be appreciated that the present invention can be implemented in numerous ways, including as a process, an apparatus, a system, a device, or a method. Several inventive embodiments of the present invention are described below.

In one embodiment, a method for editing image data is provided. The method initiates with identifying shadow image data within the image data. The method includes maintaining running average data representing an average of previous pixel values and applying a smoothing function to the shadow image data. When applying the smoothing function, the raw image data, the processed shadow image data, or the running average data may be selected to be output. The method also includes presenting the first and the second portion of image data.

In another embodiment, an apparatus having the ability to remove shadows from image data is provided. The apparatus includes image capture circuitry and a graphics processor. The apparatus includes shadow remover circuitry in communication with the image capture circuitry and the graphics processor. The shadow remover circuitry includes shadow remover location circuitry configured to identify shadow image data and shadow correction circuitry configured to selectively apply a smoothing function to the shadow image data based on a value of the shadow image data. The shadow correction circuitry is configured to select between smoothed shadow image data and a value representing an average of neighboring pixel values of non-shadow image data. A display to present an output of the shadow remover circuitry is also included.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, in which like reference numerals designate like structural elements.

DETAILED DESCRIPTION

An invention is described for methods, apparatuses, and systems for improving image data captured through a computing device having limited resources. It will be obvious, however, to one skilled in the art, that the present invention may be practiced without some or all of these specific details. In other instances, well known process operations have not been described in detail in order not to unnecessarily obscure the present invention.

The embodiments described herein provide methods, apparatuses, and systems for improving the quality of a displayed captured image. In one embodiment, a captured image is analyzed to identify in which portions, if any, shadowing has occurred due to inadequate lighting, too bright of a background, or other environmental factors. Once analyzed, the image quality can be significantly improved by applying shadow remover techniques to shadowed portions of the image. The captured image is edited to remove or reduce any shadowing to improve the image quality, while considering the desire to prevent unnecessary distorting of the image. A user viewing captured image often has an expectation of what the image should look like. For instance, an area of an image that has a slight amount of shadowing of a fixed structure, e.g., a building, may not be noticed by the viewer. However, shadowing near the eyes of a person in the same image is more likely to be noticed because the viewer may have an expectation of what the person, including the area near the person's eyes, should look like. Therefore, in one embodiment, it is possible for the user to select a portion or portions of an image and apply the shadowing to only those selected areas. In another embodiment, the shadow remover detects if an image has any shadowed portions, and reduces or eliminates the shadowed portions of the image by applying a smoothing function to the image, thereby automatically improving the quality of the displayed image. For example, face recognition algorithms may be used to identify facial regions and selectively apply the shadow remover functionality described herein to the detected facial regions. While the embodiments describe shadow removal, the embodiments may also be extended to reduce areas of a digital image that are too bright as explained below.

Figure 1:
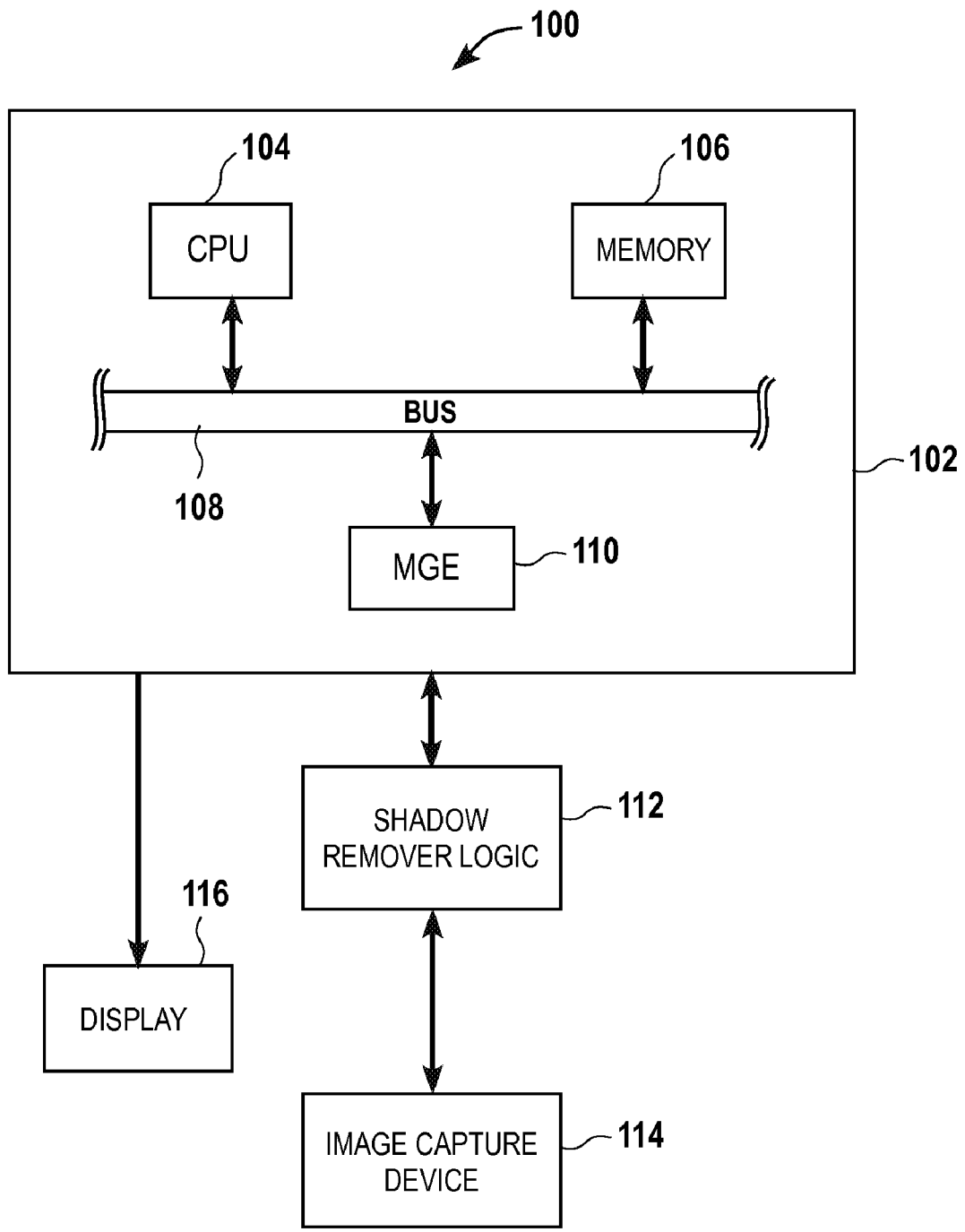
FIG. 1 is a block diagram that illustrates a system for providing a shadow remover that may be used to implement the invention.

FIG. 1 is a block diagram that illustrates a system 100 for providing a shadow remover that may be used to implement the invention. As shown in FIG. 1, computing unit 102 includes a Central Processing Unit (CPU) 104, a memory 106, a bus 108, and a Mobile Graphics Engine (MGE) 110. Bus 108 provides a communication route through which data can travel between CPU 104, Memory 106, and MGE 110. Bus 108 may be implemented by any means that allow the functional units of computing unit 102 to communicate with each other. Computing unit 102 may be implemented on a Personal Computer (PC), a cell phone, a web tablet, a personal PC, a Personal Digital Assistant (PDA), a laptop, etc., which includes image capture capability. Although the foregoing are examples, it should be appreciated that any computing device, either portable or non-portable, may be used to implement the invention, even though the embodiments described herein are suitable for a limited computing resource and battery powered device.

Computing unit 102 is in communication with image capture device 114 through a shadow remover logic unit 112. It should be noted that image capture device 114 may be a charged coupled device (CCD) or a complementary metal oxide semiconductor (CMOS) chip. Computing unit 102 receives image data from the image capture device 114 via the shadow remover logic unit 112. In one embodiment, shadow remover logic unit 112 processes the image data to determine if shadow areas are present. In another embodiment, the shadow areas can be selected or designated by the user as explained further below. The image capture device 114 may be a stand-alone unit, or may be integrated into the computing unit 102, e.g., a cell phone having a camera. Shadow remover logic unit 112 may be constructed of discrete circuitry, logic gates, or implemented in software and may be integrated onto computing device 102 or image capture device 114. In one embodiment, shadow remover logic unit 112 is integrated into MGE 110. Display 116 may be a computer monitor, a Liquid Crystal Display (LCD), or a Thin Film Transistor display of computing device 102. Shadow remover logic unit 112 may also be configured to reduce the brightness of certain areas of a digital image as discussed in more detail below.

Figure 2:
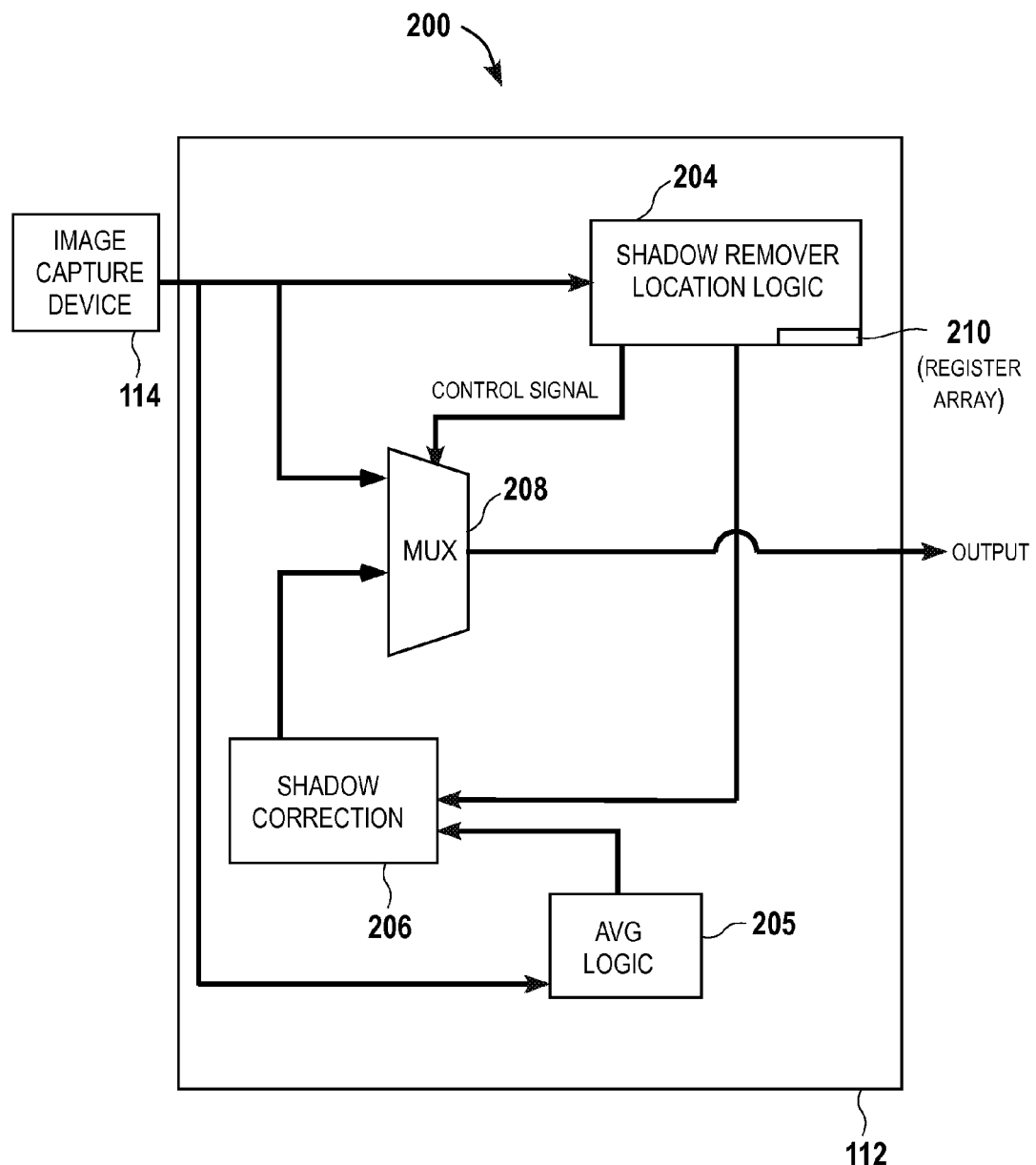
FIG. 2 is a block diagram of the shadow remover logic unit, in accordance with one embodiment of the present invention.

FIG. 2 is a block diagram 200 of the shadow remover logic unit 112, in accordance with one embodiment of the present invention. Shadow remover logic unit 112 contains circuitry that analyzes the image data from image capture device 114. This analysis determines if portions of a captured image contain any shadowing, and if so, determines which type of shadow correction is applied to improve the quality of the image. As mentioned below, the embodiments may be extended to reducing the brightness of certain areas also and are not limited to shadow removal. However, for illustrative purposes, the shadow remover embodiment is discussed in detail.

Shadow remover logic unit 112 of FIG. 2 passes either smoothed or unsmoothed image data to the computing device which controls the display of the image data. Image data from the image capture device is transmitted to shadow remover logic unit 112. In an embodiment where the image data is to be filtered, the image data may be temporarily stored in a line buffer incorporated into shadow remover logic unit 112. The image data is provided to a shadow remover location (SRL) logic unit 204, to multiplexer (MUX) 208, and to average logic module 205. SRL logic unit 204 is configured to calculate if any portions of a captured image contain shadowing that should be corrected. In one embodiment, SRL logic unit 204 compares each of the individual pixel values in regions identified as shadow regions of the captured image to a predetermined threshold value. As discussed below, a user may select the regions for the shadow remover logic to operate on or the regions may be identified through an algorithm, such as a facial recognition algorithm. The location of the regions identified as shadow regions is stored in memory elements, e.g., register array 210. In one embodiment, a smoothing function is applied to any pixel values that are below the predetermined threshold value. The smoothing function is applied so that the pixel values are increased for the shadow areas in a manner that avoids artifacts from the processing to appear in the image data. That is, the image data in the shadow area is increased in the embodiments explained below so that a smooth transition with the bordering areas is provided. It should be appreciated that an inverse of the shadow smoothing function may be applied to any pixel values that are equal to or above the predetermined threshold value for areas of the image identified as too bright in order for these areas to be dimmed.

Figure 5A:
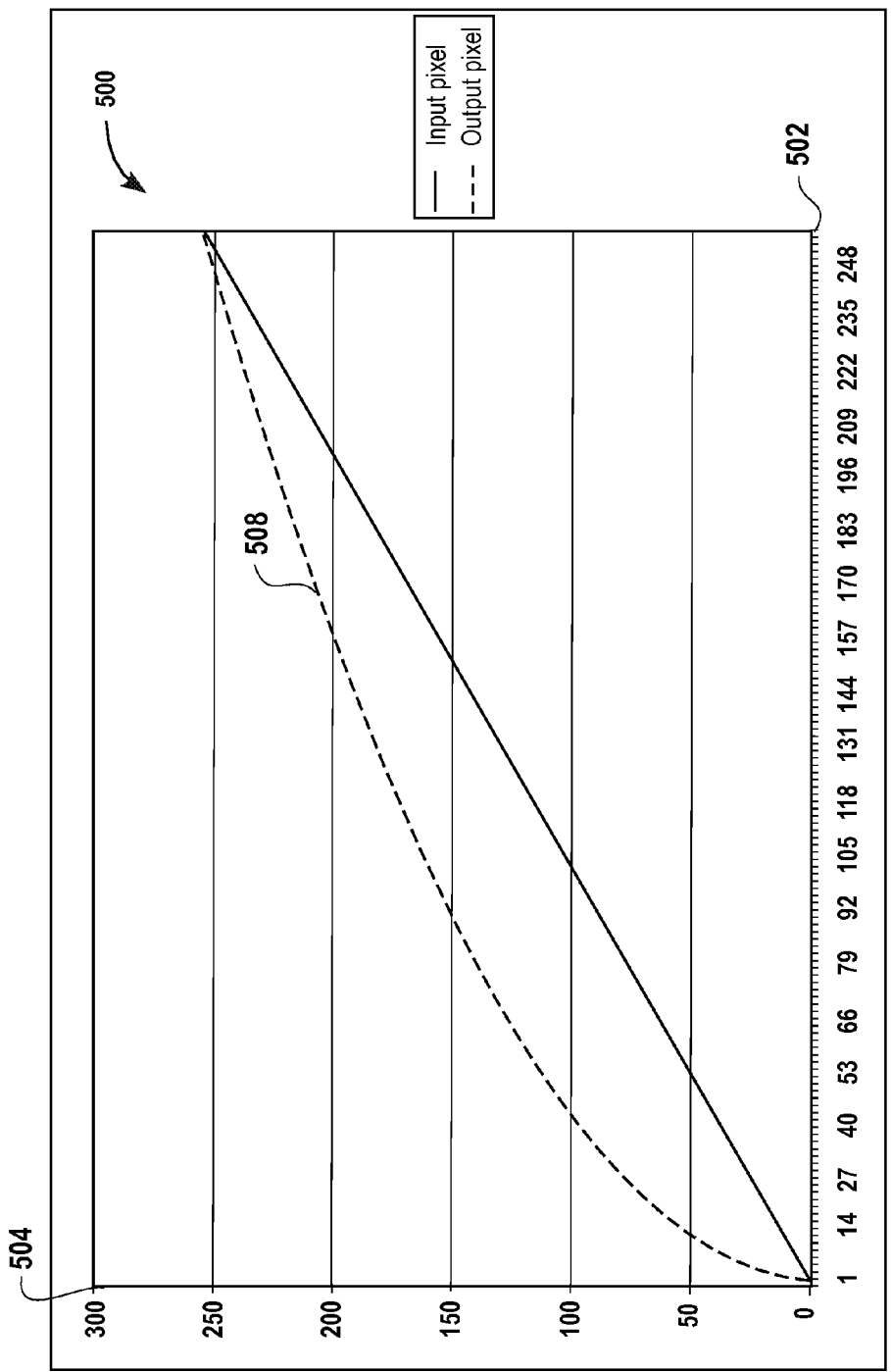
FIGS. 5A and 5B illustrate graphical representations of a set of gamma functions, in accordance with one embodiment of the invention.
Figure 5B:
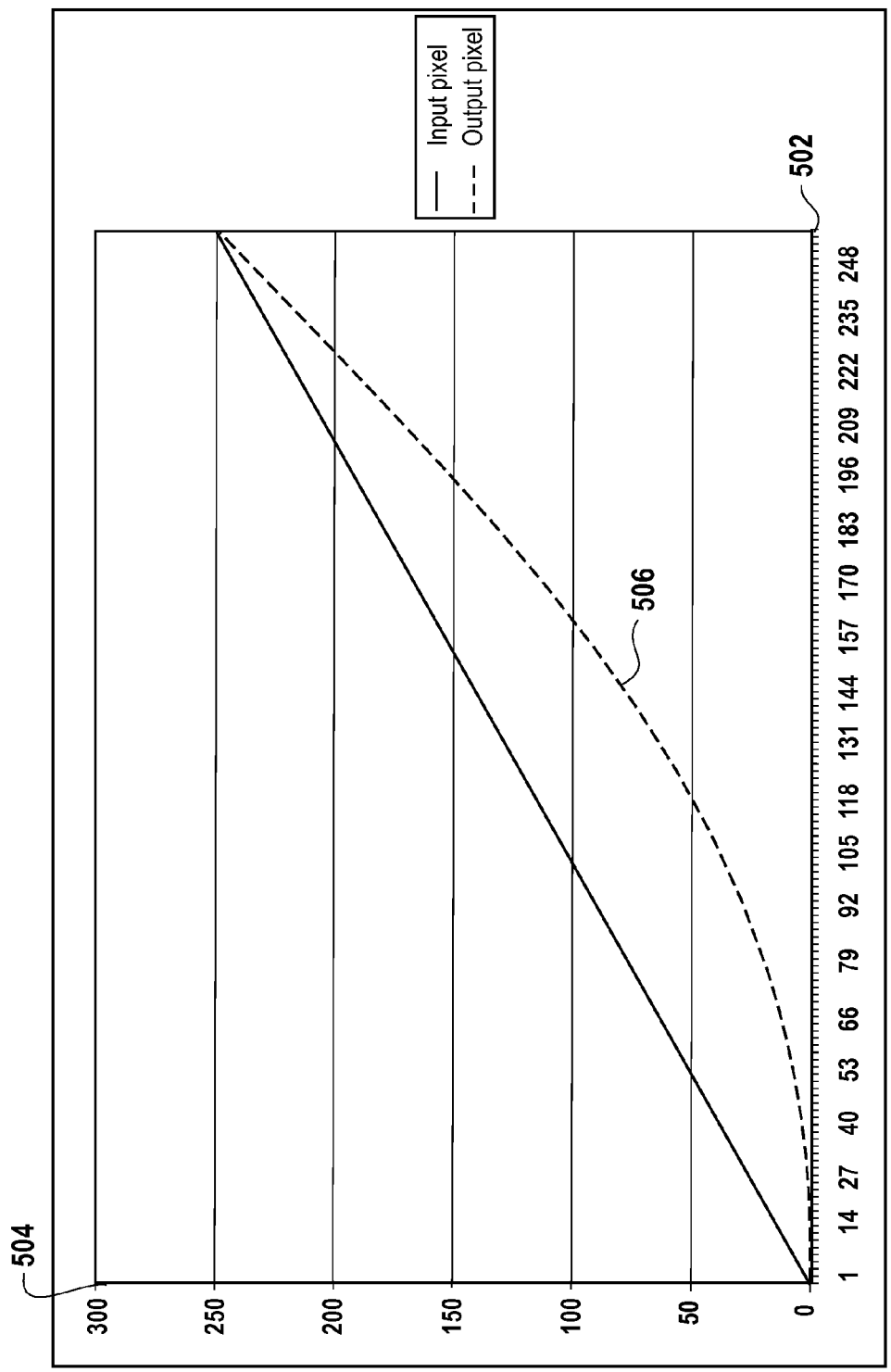

In one embodiment, the smoothing function and the inverse of the smoothing function may be a gamma function and the inverse of the gamma function, respectively, as illustrated in FIGS. 5A and 5B. One skilled in the art will appreciate that a gamma function is any function that when applied to a pixel value, yields a new pixel value that allows a larger change for smaller pixel values, and a smaller change to larger pixel values, in one embodiment. The application of the gamma function has the effect that pixel values below the threshold range have an increasingly larger value applied to the pixel values the farther that the pixel value is below the threshold value, i.e., the darker the pixel is the more the pixel value is incremented. On the other hand, for dimming a bright area, pixel values above a threshold value will have an inverse gamma function applied to the pixel values resulting in a decreasingly smaller value applied to the pixel values the closer the value is to the threshold value. In this manner, for both dimming an area and brightening an area, a smoothing effect will occur because as pixel values vary from below the threshold range to above the threshold range, the amount of correction applied to the pixels in the image is adaptively controlled. Thus, no drastic transitions occur within the smoothed regions, which would have the effect of distorting the final image.

In one exemplary embodiment for brightening an area, i.e., applying shadow remover logic, a threshold value range is predetermined to be 40. In this embodiment, any pixel values below 40 within a shadow region have a gamma function applied to them, Pixel values between 40 and 50 may have a constant value added to them in one embodiment. An exemplary graphical illustration of a gamma function is shown with reference to FIG. 5A and an exemplary inverse of the gamma function is shown in FIG. 5B. If shadow correction is needed, SRL logic unit 204 transmits the shadow corrected image data via shadow correction unit 206 to MUX 208. In one embodiment, SRL logic unit 204 determines whether the location of the pixel being processed is associated with a shadow region. It should be appreciated that this location data may be stored as an x start address and a y end address in corresponding registers in one embodiment. These addresses may be generated through user selection or algorithms, e.g., facial recognition algorithms, in one embodiment. MUX 208 receives a control signal from SRL logic unit 204 instructing MUX 208 to select one of two input lines for eventual output. The two input lines of MUX 208 include an input line from image capture device 114 and an input line from shadow correction unit 206. In one embodiment, a line buffer may be provided between image capture device 114 and multiplexer 208 to temporarily store the image data. If the control signal is configured to select the unprocessed image data for image capture device 114, then SRL logic unit 204 determined that the pixel location was not in a shadow region in one embodiment. Alternatively, if the control signal is configured to select the image data output from shadow correction block 206, then SRL logic unit determined that the pixel was located in a shadow region.

As mentioned above, SRL logic unit 204 contains register array 210. Register array 210 may stores a plurality of threshold range values corresponding to respective shadow correction values, as well as the x and y coordinates of the shadow region or regions. In one embodiment, ranges may be chosen as illustrated in Table 1, where x represents an individual pixel value.

TABLE 1

| Exemplary Threshold value Ranges | Shadow Correction Values |
|---|---|
| x < 40 | Gamma function |
| 40 ≤ x < 50 | Constant |

T It should be appreciated by those of ordinary skill in the art that the threshold ranges and shadow removal values given in Table 1, are only exemplary, and many other values are possible. As illustrated in Table 1, where a pixel value is associated with a shadow region, and the pixel value is 40 or less, then a gamma function is applied to generate a new pixel value for display. Referring to FIG. 5A, the particular graph would bump up the pixel value of 40 to a value of about 100. Where the pixel value is equal to or greater than 40 and less than 50, and the location of the pixel value is within the shadow region, then a constant is added to generate a new pixel value. For example, the constant may be to add 20 to the pixel values to generate the new pixel value. It should be noted that the constant may be any suitable value and is not limited by the exemplary values discussed herein.

In order to prevent artifacts from occurring at the border of the shadow region, averaging logic module 205 may be utilized. Averaging logic module 205 calculates a running average of the previous x number of pixels, where x can be any integer. For example, in one embodiment, the average of the previous eight pixels may be calculated and this average can be compared to the pixel value from the SRL logic unit 204. If the pixel is within a shadow region, and if the pixel value from the SRL logic unit 204 is greater than the calculated average value, then the calculated average value is output from shadow correction module 206 to multiplexer 208. In this manner, average logic 205 provides a ceiling for the values in the shadow region so that a smooth transition from the non-shadow region to the adjusted shadow region is provided. That is, the image is preserved so that at the transition from the non-shadow region to the shadow region a smooth transition rather than an abrupt spike in brightness is provided. Multiplexer 208 outputs the selected value to memory for storage and eventual display in one embodiment.

Figure 3:
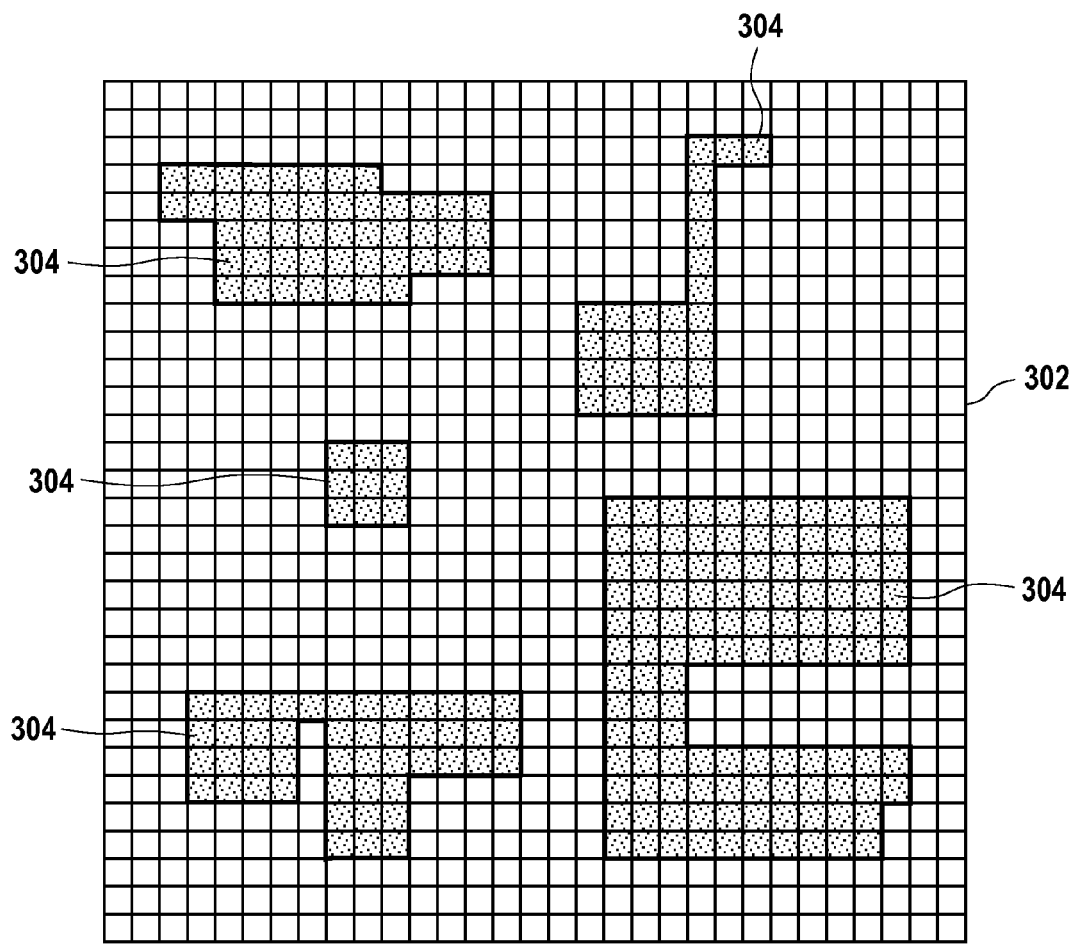
FIG. 3 is a simplified schematic of image data having shadow regions in accordance with one embodiment of the invention.

FIG. 3 is a simplified schematic of image data having shadow regions in accordance with one embodiment of the invention. Image data 302 includes shaded regions 304 that are designated as shadow regions where the pixel values are processed to manipulate the shadows. It should be appreciated that the shaded regions may be selected by a user or generated by shadow identifying algorithms. The address locations for shaded regions 304 may be stored in registers in one embodiment. One skilled in the art will appreciate that location logic may be used to determine if a location of a pixel is within a certain region, e.g., the addresses identifying shaded region 304.

Figure 4:
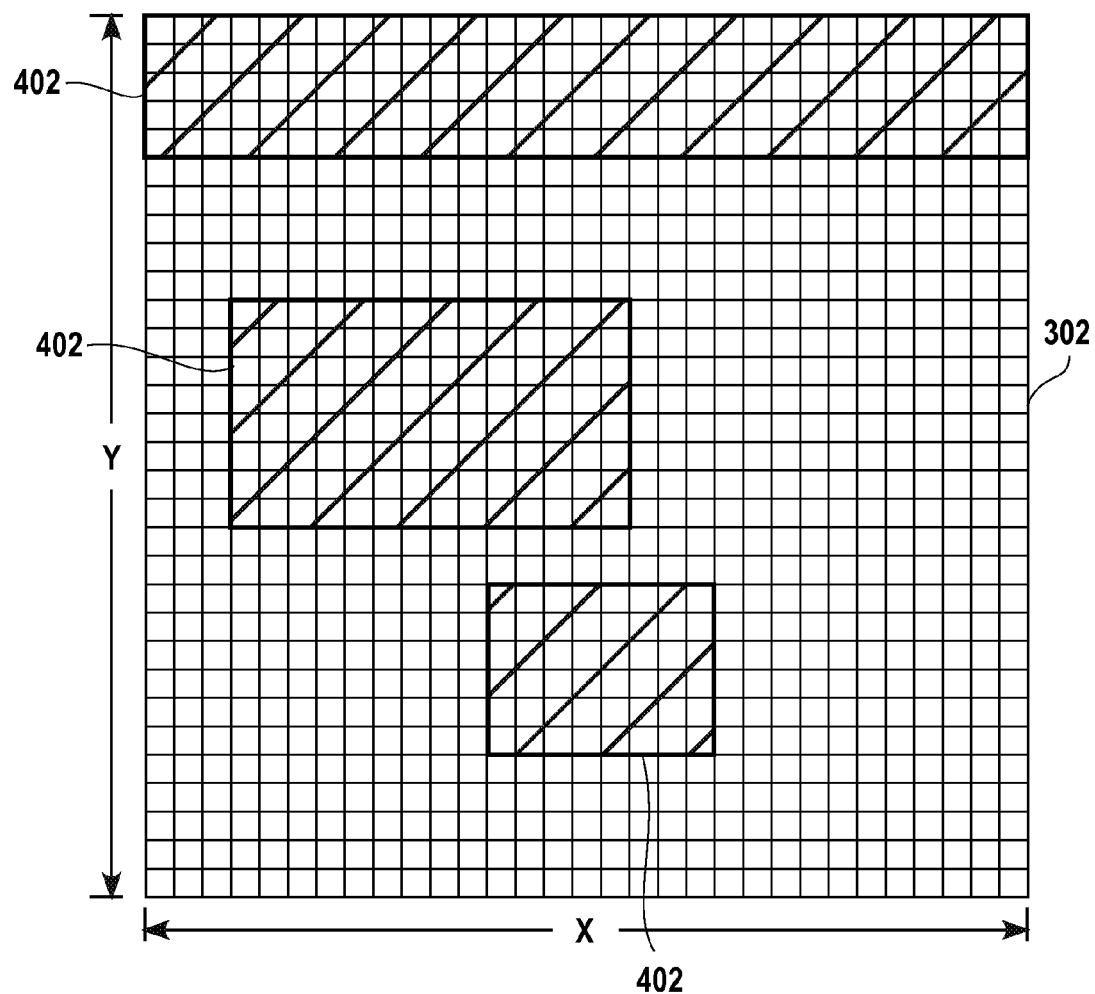
FIG. 4 is a simplified schematic diagram illustrating another embodiment of image data having shadow regions.

FIG. 4 is a simplified schematic diagram illustrating another embodiment of image data having shadow regions. In FIG. 4, regions 402 of image data 302 are regions that have shadows identified for processing through the shadow remover logic described herein. Regions 402 are each of a rectangular shape, enabling each region to be identified by an x start address and a y stop address. The x start address and the y stop address are stored in respective registers in one embodiment. In one embodiment, a user may select the x start address and the y stop address for each of regions 402 through a cursor associated with a graphical user interface displaying image data 302. The user can simply place a cursor over a certain location of the image data and select the x start location and then the y stop address, i.e., an upper left corner and a lower right corner of each of regions 402, respectively, and these addresses can be committed to the corresponding registers.

FIGS. 5A and 5B illustrates a graphical representation of a gamma function and its inverse, in accordance with one embodiment of the invention. In one embodiment the gamma function 506 of FIG. 5A is represented by the exponential function $e^{1/x}$ and the inverse of the gamma function 508 is represented by the exponential function $e^x$. Here, "e" is the constant that represents the natural logarithm and x is a value greater than 1. However, it should be understood by those skilled in the art that the mathematical functions described herein are merely examples of gamma functions, and there are many other mathematical functions that can be used to describe gamma functions. A gamma function may be any function that can be applied to the pixel values wherein a larger change is applied to smaller pixel values and a smaller change is applied to larger pixel values. In one embodiment, this technique has the effect for pixel values below the threshold range value to have an increasingly larger value applied to pixel values as the pixel values become increasingly smaller than the threshold value. On the other hand, pixel values above the threshold range value have an inverse gamma function applied to them resulting in a decreasingly smaller value applied to the pixel values the farther their value is above the threshold range for embodiments where the pixels are too bright or are being dimmed. In this manner, a smoothing effect occurs since the amount of correction applied to the pixels in the image is adaptively controlled so that no drastic transitions occur to avoid distorting the final image.

Referring to FIGS. 5A and 5B, the x axis 502 represents pixel values which range from lower values to higher values (from left to right on the x axis 502), and the y axis 504 represents an increasing amount of gamma correction (from bottom to top on the y axis 504). As can be seen in graph 500, as the pixel values (x) increase, the amount of gamma correction (y) along the gamma function 508 increases rapidly at first and then tapers off. Similarly, with regard to the inverse gamma function illustrated in FIG. 5B, curve 506 allows for a larger correction to be applied as the pixel values become farther away from the threshold value. Curves 506 and 508 are exemplary curves and not meant to be limiting as alternatively shaped curves may be employed. Curve 506 represents a gamma function having a format of $e^x$, while curve 508 represents a gamma function of $e^{1/x}$.

Figure 6:
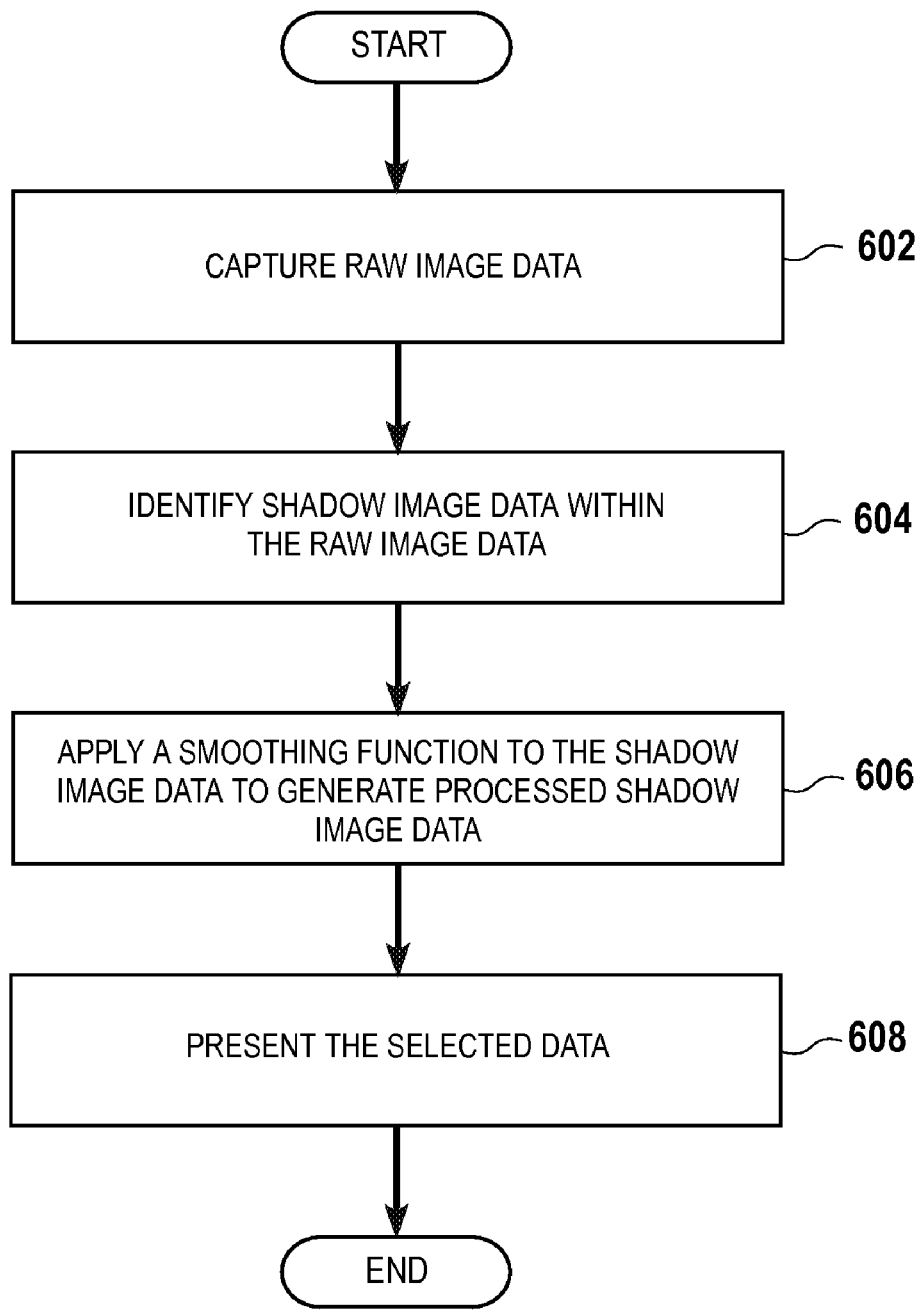
FIG. 6 is a flow chart diagram illustrating method operations for providing a shadow remover, in accordance with one embodiment of the present invention.

FIG. 6 is a flow chart diagram illustrating method operations for providing a shadow remover, in accordance with one embodiment of the present invention. The method initiates with operation 602 where images are captured through an image capture device, e.g. a digital camera or other electronic image capturing device. The electronic image capture device generates pixel values to represent captured images, either through a CCD or CMOS chip. It should be understood by those skilled in the art that the methods described herein may be extended to any image data represented in electronic form. For example, a non-electronic image such as a photograph may be converted into electronic form through a scanner, and the embodiments described herein may be applied to the electronic representation.

The method then advances to operation 604 where shadow image data is identified within the image data. In an alternative embodiment, a region that is too bright may be identified. The shadow image data may be identified by the user or with image recognition logic as described with reference to FIGS. 3 and 4. From operation 604, the method proceeds to operation 606, where a smoothing function is applied to the shadow image data. Depending on whether the embodiments are removing shadows or removing bright spots, i.e., the pixel value is below or above a threshold value, respectively, the smoothing function will adaptively increase the pixel value or decrease the pixel value, respectively. One skilled in the art will appreciate that in this manner, the data is smoothed going in and smoothed coming out. In another embodiment, an offset value can be added to data between specified values as discussed with reference to Table 1. The embodiments may include maintaining a running average of the pixels and comparing this average to an output from the smoothing function. For shadow removal, if the average is less than the output of the smoothing function, then the pixel value is set to the average value. For brightness dimming, if the average is greater than the output of the smoothing function, then the pixel value is set to the average value. Thus, through the averaging function, a ceiling is established for brightening a shadow region or a floor is established for dimming a overly bright region, In operation 608 the image data are presented with the shadow portions adjusted, or the bright regions adjusted.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

The invention claimed is:

1. A method for editing image data, comprising:
capturing raw image data and generating values for pixels in the raw image data;
identifying shadow image data within the raw image data;
maintaining running average data representing an average of previously-generated pixel values;
applying a smoothing function to the shadow image data to generate processed shadow image data, the applying including,
selecting one of the raw image data, the processed shadow image data,
or the running average data; and
outputting the selected data.

2. The method of claim 1, further comprising:
selecting the processed shadow image data through a multiplexer for output.

3. The method of claim 1, wherein identifying shadow image data within the image data is a user selectable feature.

4. The method of claim 1, wherein identifying shadow image data within the image data includes storing a starting x address and a starting y address of the identified shadow image data.

5. The method of claim 1, further comprising:
selecting between the processed shadow image data or the running average data prior to considering the raw image data for selection.

6. The method of claim 1, further comprising:
identifying bright region image data within the raw image data;
applying an inverse of the smoothing function to the bright region image data to generate processed bright region image data, the applying of the inverse of the smoothing function including,
selecting one of the raw image data, the processed bright region image data, or the running average data.

7. The method of claim 1, wherein the smoothing function and the inverse of the smoothing function are gamma functions.

8. The method of claim 1, wherein the applying of the smoothing function further comprises,
incrementing pixel values within the shadow image data by a constant value.

9. A portable device, comprising:
image capture circuitry;
a graphics processor; and
shadow remover circuitry in communication with the image capture circuitry and the graphics processor, the shadow remover circuitry including shadow remover location circuitry configured to identify shadow image data and shadow correction circuitry configured to selectively apply a smoothing function to the shadow image data based on a value of the shadow image data, the shadow correction circuitry configured to select between smoothed shadow image data and a value representing an average of neighboring pixel values of non-shadow image data; and
a display to present an output of the shadow remover circuitry.

10. The portable device of claim 9, wherein the shadow remover location circuitry provides a control signal configured to select between output of the shadow correction circuitry and output of the image capture circuitry.

11. The portable device of claim 9, wherein the shadow remover circuitry includes a multiplexer receiving output of the image capture circuitry and output of the shadow correction circuitry.

12. The portable device of claim 11, wherein the multiplexer receives a selection signal from the shadow remover location circuitry.

13. The portable device of claim 9, wherein the shadow remover location circuitry includes a register array containing a set of threshold values.

14. The portable device of claim 13, wherein the register array stores start and stop addresses identifying the shadow image data.

15. The portable device of claim 13, wherein the register array stores a threshold range wherein values of the shadow image data within the threshold range are incremented by a constant value.

* * * * *